US006768824B2

United States Patent
Ramachandran

(10) Patent No.: US 6,768,824 B2
(45) Date of Patent: Jul. 27, 2004

(54) TUNABLE POLARIZERS

(75) Inventor: Siddharth Ramachandran, Hoboken, NJ (US)

(73) Assignee: Fitel USA Corp, Norcross, GA (US)

( * ) Notice: Subject to any disclaimer, the term of this patent is extended or adjusted under 35 U.S.C. 154(b) by 135 days.

(21) Appl. No.: 10/278,230

(22) Filed: Oct. 23, 2002

(65) Prior Publication Data

US 2004/0081383 A1 Apr. 29, 2004

(51) Int. Cl.$^7$ .............................. G02B 6/00; G02B 6/26
(52) U.S. Cl. ......................................... 385/11; 385/28
(58) Field of Search .............................. 385/11, 12, 27, 385/28, 37, 123, 124, 146, 147

(56) References Cited

U.S. PATENT DOCUMENTS

| | | | | |
|---|---|---|---|---|
| 4,793,769 A | * | 12/1988 | Dolan | 473/588 |
| 5,740,288 A | * | 4/1998 | Pan | 385/11 |
| 5,991,483 A | * | 11/1999 | Engelberth | 385/37 |
| 6,347,164 B1 | * | 2/2002 | Rudkevich | 385/11 |
| 6,535,665 B1 | * | 3/2003 | Kim et al. | 385/28 |
| 2001/0033710 A1 | * | 10/2001 | Kim et al. | 385/28 |
| 2004/0042714 A1 | * | 3/2004 | Ramachandran | 385/28 |

* cited by examiner

Primary Examiner—John R. Lee
Assistant Examiner—Christopher M. Kalivoda
(74) Attorney, Agent, or Firm—Peter V.O. Wilde

(57) ABSTRACT

The specification describes tuning devices for controlling variable polarization dependent loss. These are based on the discovery that essential properties of TAP LPGs can be realized in birefringent fibers, i.e. in fibers where the propagation constants of the core and/or cladding modes are different for different SOPs of light. This yields a device that exhibits broadband loss of varying amounts for different SOPs of input light. Thus, the building block for a broadband in-fiber polarizer is realized. Tuning mechanisms are applied to vary the relative coupling magnitudes for two orthogonal SOPs of light in the device. This yields a polarizer in which the polarization is dynamically tuned.

12 Claims, 5 Drawing Sheets

TUNABLE POLARIZERS

FIELD OF THE INVENTION

This invention relates to tunable polarizers in an optical fiber transmission systems wherein the polarizer device comprises an optical fiber integrated with the optical fiber of the transmission system. More particularly it is directed to such devices that have means for dynamic tuning to yield polarization loss equalizers.

BACKGROUND OF THE INVENTION

Polarization effects in fiber-optic transmission systems are well known. The effects of unequal loss between modes that propagate with different states of polarization have been studied, and several approaches to compensating for this effect have been proposed. A fiber-optic transmission line is ideally polarization insensitive, so that lightwave signals in any state of polarization (SOP) propagate with similar attenuation, pulse shape and velocity. In reality, a transmission system contains several components and fibers that attenuate light in different SOPs to varying degrees. This is called polarization dependent loss (PDL), and is deleterious to the performance of a communication link because random fluctuations in signal SOP translate into random fluctuations in the power of the signal. Moreover, concatenation of several devices and fibers with varying amounts of PDL makes the overall PDL time-dependent, because of random mode-coupling phenomena throughout the transmission line. Mitigating this effect would entail adding components that offer selective attenuation to different SOPs of light. Thus, a device with predetermined PDL would serve to negate the PDL of a series of components, yielding a transmission line that has no PDL.

A variety of compensation means using static elements have been proposed. These operate on the assumption that the intrinsic polarization dependency of the system remains constant. Should new polarization effects arise, the system requires reconstruction of the compensating elements to restore equalization. Dynamic changes in the system polarization may arise from a variety of factors, including for example, physical handling and bending of the optical fiber for splicing etc., and changes in temperature of the system ambient. To address dynamic system effects requires a dynamic or tunable compensation device.

Moreover, since PDL of a series of devices is time-dependent, effective compensation requires a device with tunable PDL. Adjustable PDL compensators have been used to decrease the 2% power penalty tail in a 10 Gb/sec system from 6.5 dB to 1.5 dB (See L. S. Yan et. al, ECOC-2001, We p. 38). In addition, PDL in the presence of polarization mode dispersion (PMD) not only increases the system penalty but also mitigates the effectiveness of polarization-mode-dispersion (PMD) compensation schemes. Thus, a tunable PDL controller (called PDLcon, hereafter) that equalizes the PDL of a transmission system is also important in PMD compensation schemes.

The building block for a PDLcon is a polarizer that attenuates light in selected SOPs. Several existing fiber-device technologies may be used to achieve this. Existing fiber polarizers fall into two broad categories. The first is a set of devices that comprise a fiber-waveguide structure in which an attenuating or birefringent material interacts with the evanescent mode to selectively attenuate one SOP, while not perturbing the orthogonal SOP of light. These devices may be implemented using a single crystal, liquid crystal or birefringent polymer cladding around the core of the fiber, or by polishing one side of the fiber and metallizing it. An alternative to adding some attenuating or birefringent material is to design the fiber-waveguide such that only one of the two orthogonal SOPs is guided by the fiber. All these devices are broadband and offer strong polarization extinction, but their PDL cannot be tuned as would be required of a PDLcon. The other class of devices comprises long period fiber-gratings (LPG) written in birefringent fibers. LPGs have been written in birefringent fibers to yield polarizers with up to 30-dB polarizability. The PDL obtained is thus limited to the bandwidth of the resonance of the grating (1–2 nm). The bandwidth may be broadened by chirping the grating, but an inherent trade-off between bandwidth and tunability of such gratings makes them unsuitable as PDL-con devices.

Typical prior art variable or tunable PDL devices comprise free-space components. For example, a variable PDL device disclosed in U.S. Pat. No. 5,740,288 comprises polarization beam-splitters, combiners and liquid crystal cells. The orientation of the liquid crystal cells serve to selectively attenuate one of the SOPs by controllable amounts, thus yielding a variable PDL device. U.S. Pat. No. 6,347,164 discloses a variable PDL device that comprises polarization beam-splitters, combiners and planar lenses, where the PDL is varied by tilting the planar lenses with respect to light incident on it. Both of these prior art devices involve careful assembly of several free-space optical components. Free space optics (as contrasted with integrated optics wherein the signal remains in a common medium for processing) are costly, lossy and may not be reliable in challenging applications such as under-sea transmission systems.

Thus, there exists the need for an integrated optical device that can offer variable PDL over a large spectral bandwidth while maintaining the low loss, low cost and reliable characteristics of all-fiber devices. Ideally, the integrated optical device would comprise an optical fiber integrated system.

SUMMARY OF THE INVENTION

This invention resides in part on the recognition of the characteristics of known grating elements, in this case long-period fiber gratings (LPGs), and their utility for the applications just described. LPGs offer coupling between co-propagating modes of a fiber, and have been used to realize wavelength selective attenuation filters. LPGs are traditionally narrow-band devices, and while they offer strong (e.g. >20 or 30 dB) loss, the spectral width of the coupling is typically limited to a range spanning from, e.g., 0.5 nm to 2 nm. On the other hand, if a fiber waveguide is engineered to yield two modes with identical group velocities a broadband spectrum is obtained in which the strength (or loss), rather than resonant wavelength, varies when tuned. This approach yields strong broadband loss-filters, in which the LPG couples the core mode to a specific higher-order cladding mode whose group velocity equals that of the core mode. Such gratings are called turn-around-point (TAP) LPGs.

The current invention is based on the discovery that the properties of TAP LPGs can be realized in birefringent fibers, i.e. in fibers where the propagation constants of the core and/or cladding modes are different for different SOPs of light. This yields a device that exhibits broadband loss of varying amounts for different SOPs of input light. Thus, the building block for a broadband in-fiber polarizer is realized. Further, tuning mechanisms are applied to vary the relative coupling magnitudes for two orthogonal SOPs of light in the device. This yields a polarizer in which the polarization is dynamically tuned. Hence, a TAP LPG written in a birefringent fiber yields a tunable PDL device.

A variety of grating tuning mechanisms are applicable to this device. The period of the birefringent TAP LPGs can be dynamically altered by changing the strain applied on the LPG (the strain may be applied by piezoelectric packages, simple motion control housings or magnetically latchable materials). Alternately, the propagation constants of the modes can be perturbed by temperature, the electro-optic effect, the nonlinear optic effect, or any other means that modifies the refractive index profile of the birefringent TAP fiber.

The all-fiber PDLcon of the invention offers such advantages over discrete free-space device as low loss, low manufacturing cost, reliability, and ease of tuning. In addition, it does not require complex polishing and film deposition steps needed for making the static fiber polarizers of the prior art.

DETAILED DESCRIPTION

Figure 1:
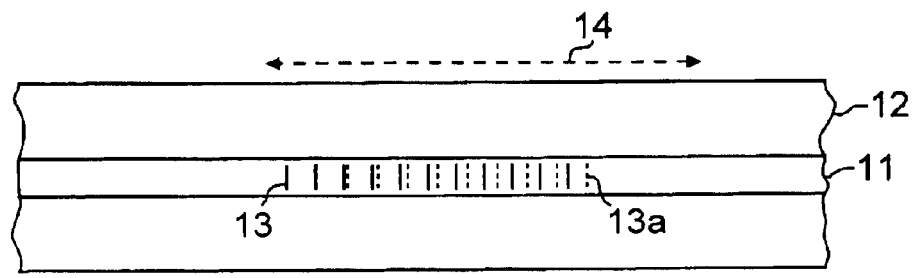
FIG. 1 is a schematic representation of one embodiment of a tunable PDLcon of the invention.

FIG. 1 shows one embodiment of the tunable PDLcon of the invention. The figure shows optical fiber 12 and fiber core 11, with a long period grating (LPG) 13 formed in the core. The optical fiber is a birefringent fiber that supports two SOPs. (The SOPs are typically orthogonally oriented with respect to one another and are designated in the discussion below as SOP ∥ and SOP•) A common form of birefringent fiber has a slightly elliptical core. A birefringent fiber may be characterized in terms of the ellipticity or ovality of the core given by:

OVALITY (%)=$(D_{max}-D_{min})/D_{avg} \times 100$

Where $D_{min}$, $D_{max}$ and $D_{avg}$ are the minimum, maximun, and average outer diameters of the fiber measured at a variety of cross-sectional angles, respectively.

In advanced optical systems, several discrete devices with non-negligible PDL are concatenated to yield an optical transmission line with significant PDL. It is these facts that create the need for the PDLcon devices described here. For these devices, it is useful to have a birefringent fiber with OVALITY greater than 1%.

As noted above, the differential loss between modes traveling with different SOPs is compensated by adjusting the relative strengths of the signal in different SOPs. The relative strength of the SOPs in the signal may be tuned by changing the period of grating 13 from one spacing to another (represented by 13a). This may be achieved by a variety of means, one of which is schematically represented by arrow 14, which indicates a physical stretching means associated with the fiber. Effective strain can be induced by electro-mechanical means, e.g. piezoelectric elements, attached to the fiber. Mechanical tensioning devices may also be used (see U.S. Pat. No. 5,991,483, incorporated by reference herein).

Figure 2:
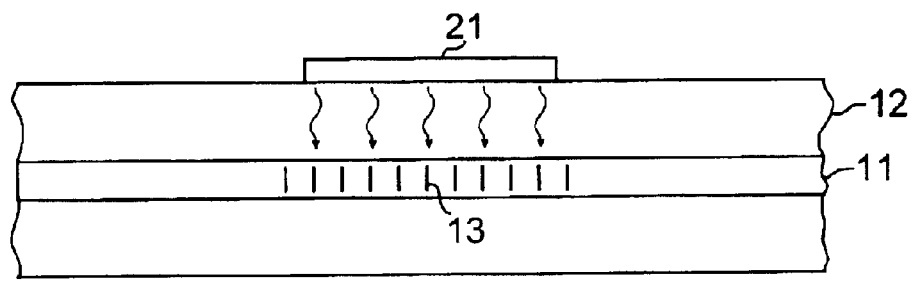
FIG. 2 is a schematic representation similar to that of FIG. 1 showing an alternative embodiment of a tunable PDLcon according to the invention.

An alternative tuning arrangement is shown in FIG. 2. As stated above, there are at least two potential tuning mechanisms for changing the relative amounts of energy in two SOPs. FIG. 1 represents changing the grating spacing. The coupling may also be influenced by changing the refractive index of the medium containing the grating, i.e. the optical fiber. Various options are also available for achieving this. For example, changing the temperature of the grating changes the refractive index. This is schematically shown in FIG. 2 where element 21 is a heating element.

The PDLcon devices described herein have some features in common with the mode converter devices described and claimed in my co-pending patent application Ser. No. 10/234,289 filed Sep. 4, 2002. The description in that application is incorporated herein by reference for common details.

Figure 3:
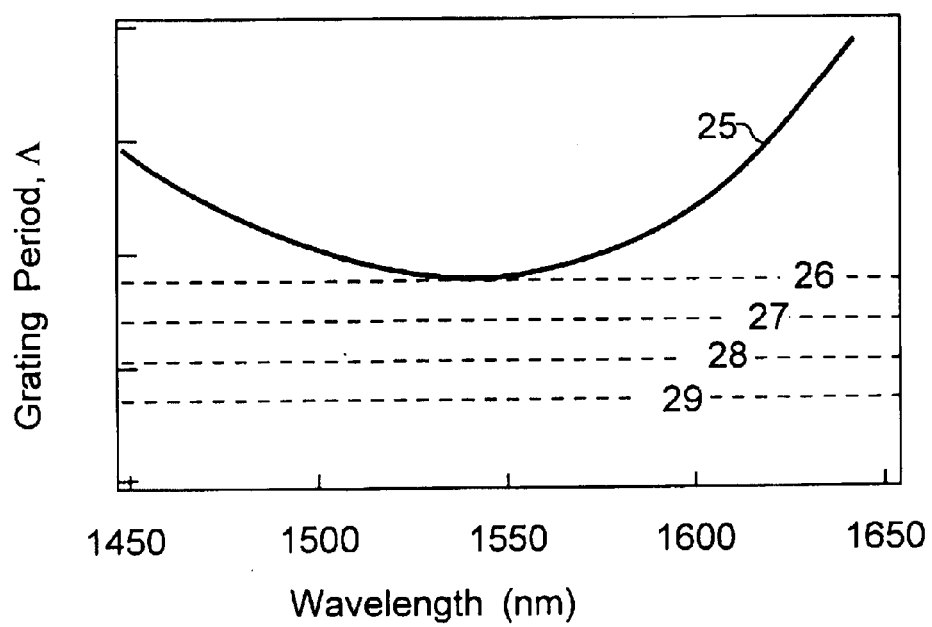
FIG. 3 is a plot of wavelength vs. grating period showing the spectral properties of a specially designed LPG.

FIG. 3 shows the phase-matching curve, 25, for an LPG that couples two modes that have identical group velocities at the design wavelength. The turn-around-point (TAP) is defined as the wavelength (and period) where the slope of the curve, 25, is zero. In the figure the TAP is shown as a minima in the phase matching curve. However, it will occur to those skilled in the art that a functionally equivalent TAP could occur as a maxima point, or it could be an inflection point, where the slope as well as the second derivative of the curve are both essentially zero. For the purpose of definition below, the use of the term minima is intended to be generic to the case where the TAP occurs at a minima or maxima, or an inflection point. In the former case, a maxima may be shown as a minima by simply inverting the scale.

Figure 4:
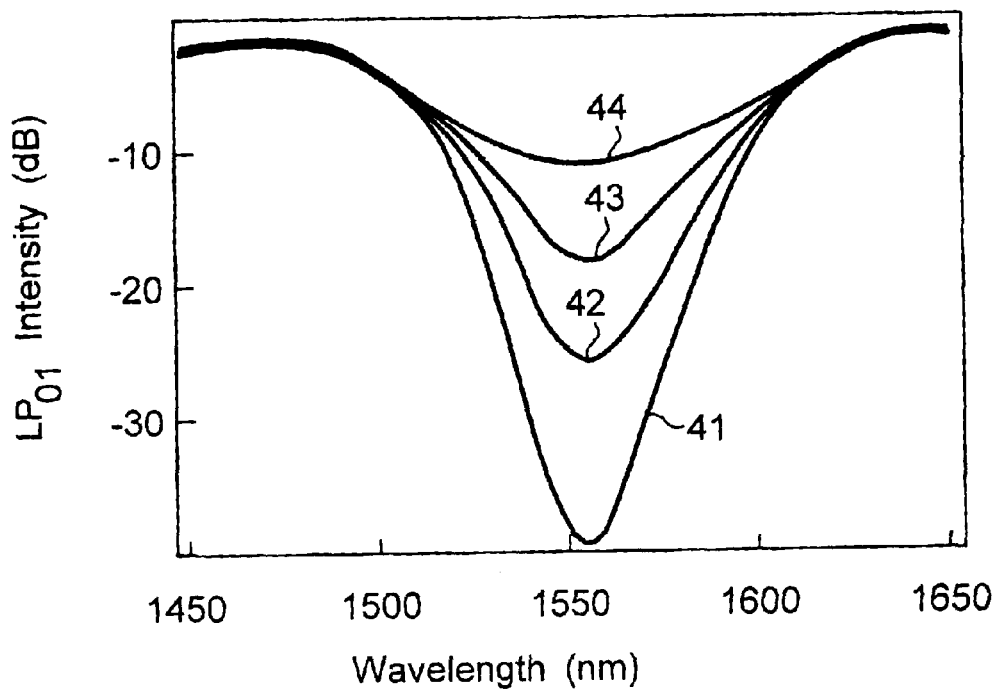
FIG. 4 is a plot of intensity vs. wavelength showing the coupling strength of the LPG of FIG. 3 with the different grating periods shown in FIG. 3.

Referring again to FIG. 3, when the LPG grating period is chosen to couple at the TAP, shown by the line 26 in FIG. 3, large bandwidth mode-coupling is achieved. See S. Ramachandran et. al, *Optics Lett.*, vol. 27, p. 698 (2002) incorporated by reference herein. FIG. 3 also shows additional lines representing grating periods at slight deviations from the TAP grating period, i.e. lines 27, 28, and 29. FIG. 4 shows that as the grating period is set at values more removed from the TAP, the strength of the coupling is reduced. Curve 41 shows the (maximum) coupling to the $LP_{01}$ mode (after the $LP_{02}$ mode is stripped out) for a grating spacing represented by line 26. Curves 42, 43 and 44 show the reduced coupling to $LP_{01}$ obtained when the grating period departs from the TAP, as represented by lines 27, 28, and 29 in FIG. 3

It should be apparent that broadband bandwidth is achieved when coupling is induced at the TAP. Note that when the grating period is varied (lines 26–29 in FIG. 3) the strength of coupling (curves 41–44 in FIG. 4) changes, but the spectral shape remains nominally the same with the maximum strength centered in each case near 1550 nm. This is in contrast to conventionally tuned LPGs, where tuning shifts the resonant wavelength of the spectrum.

In summary, and as a general rule, coupling in TAP LPGs induces broadband spectra whose coupling strength decreases as the distance between the horizontal line representing the grating period and the phase matching curve increases. This rule is strictly true for Gaussian apodised gratings, and is approximately true for uniform gratings. Thus, the coupling strength of this class of gratings may be changed without perturbing their spectral shapes.

The relationships just discussed, and FIGS. 3 and 4, provide the theoretical basis for the operation of the devices of FIGS. 1 and 2. Strength tuning can be achieved by strain, which serves to change the grating period (the device of FIG. 1). Alternately, the grating period can be held constant, and the phase matching curve can be moved. The phase matching curve is determined by the waveguide properties. This may be changed by any means that changes the refractive index profile of the fiber (the device of FIG. 2).

The invention is based on the discovery that the effects just discussed can be implemented in birefringent fibers to affect the relative portion of the signal traveling in two SOPs. Since the given condition is an inequality between the loss in these SOPs, by changing the ratio of the SOPs in the propagating signal, that inequality can be precisely compensated. Moreover, if the mechanism used for changing the ratio of the SOPs is capable of being tuned, then the equalizing device can be used as a universal compensating element, and can be used as a dynamic equalizer in systems that inherently have time varying ratios of SOPs.

Figure 5:
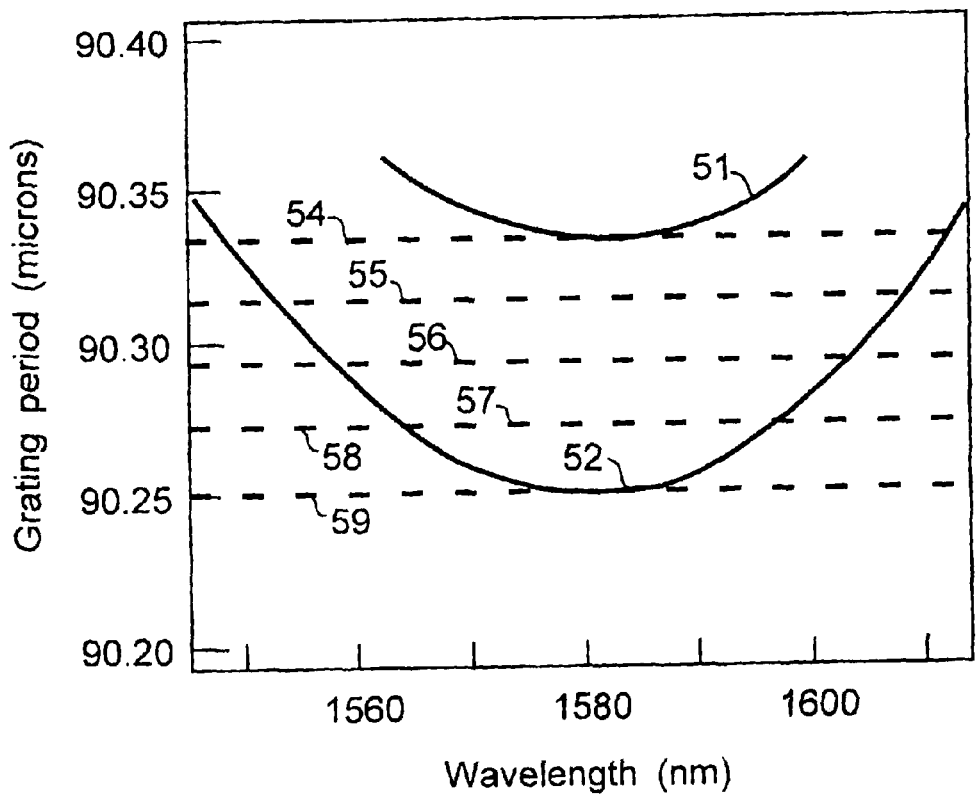
FIG. 5 is a plot of wavelength vs. grating period illustrating the spectral response of two different modes in a birefringent fiber.

FIG. 5 shows the phase matching curve for a birefringent fiber that is designed to yield two modes (the $LP_{01}$ and $LP_{02}$ modes) with identical group velocities. The design entails the occurrence of a TAP like that shown in FIG. 3. Since the fiber is birefringent, two phase matching curves 51 and 52 and two corresponding TAPs are obtained for the two orthogonal polarization eigenmodes of the fiber. Each curve independently controls the coupling characteristics for one of the two orthogonal input SOPs. Curve 51 is the phase matching curve that describes the coupling behavior of light polarized perpendicular to the birefringent axis of the fiber (SOP•), while curve 52 describes the behavior of the SOP ∥.

Figure 6:
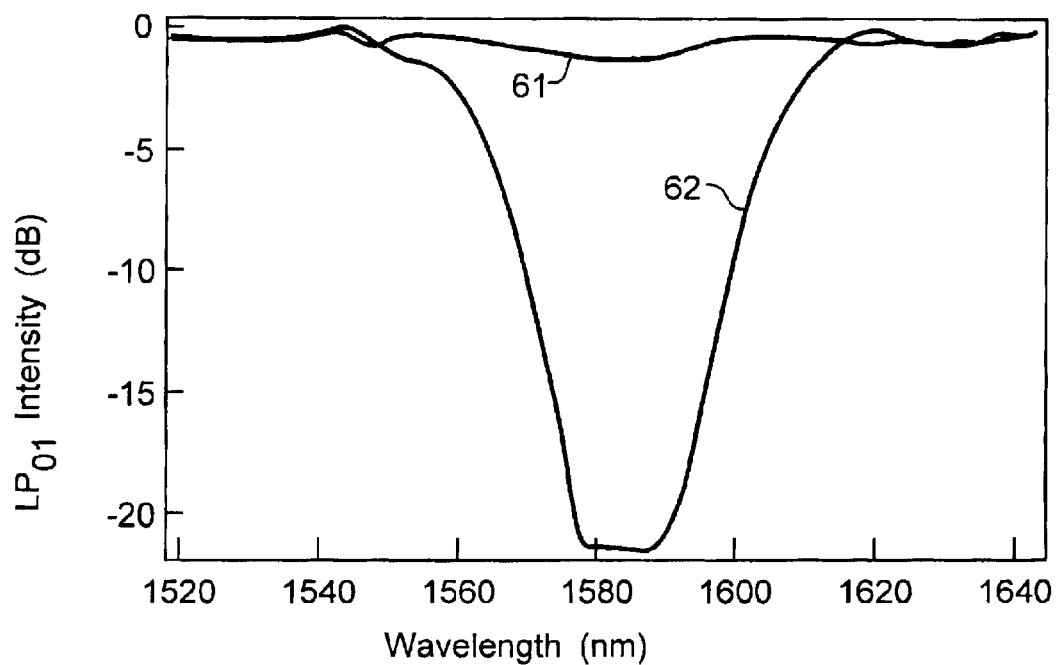
FIG. 6 is a coupling curve, i.e. a plot of wavelength vs. coupling intensity, for a grating period selected to favor coupling for one SOP.
Figure 7:
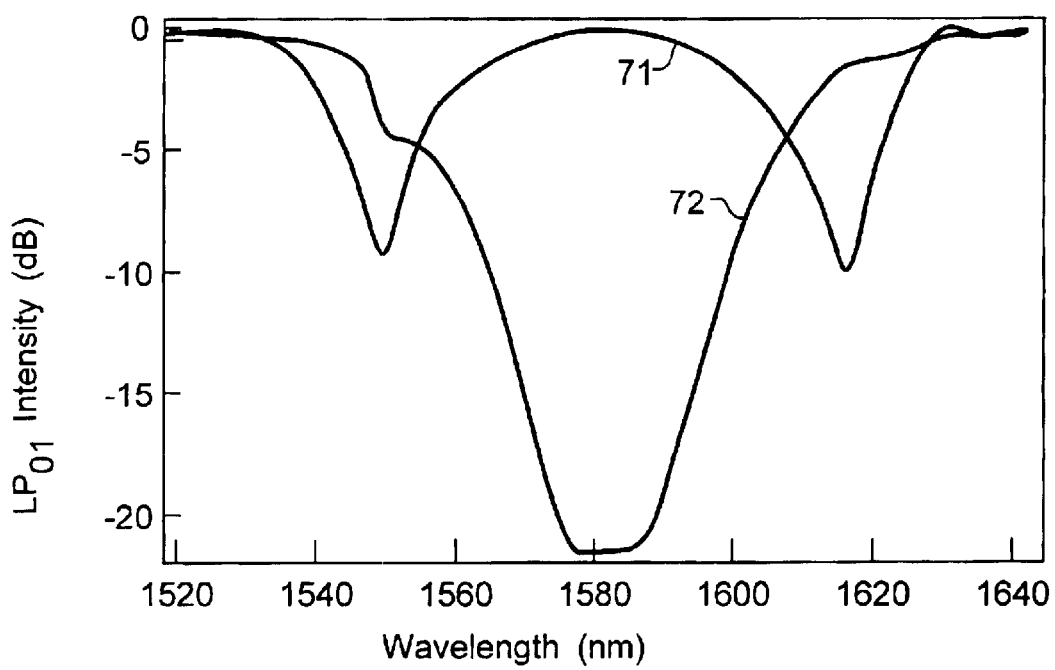
FIG. 7 is a coupling curve similar to that of FIG. 6 for a grating period selected to favor another SOP.

FIG. 5 also shows several horizontal lines 54–59 that correspond to various grating periods of LPGs whose characteristics will be described below. Writing a LPG in this fiber yields a polarizer, whose polarizability can be adjusted by varying the index change during fabrication, or by varying the grating period (curves 54–59). FIG. 6 shows the spectra, curves 61 and 62, of a 20-dB strong LPG, with a grating period (line 54 of FIG. 5) corresponding to the TAP of SOP• (curve 51 of FIG. 5). FIG. 7 shows the spectra, curves 71 and 72, for the two orthogonal SOPs when the grating period (line 59 of FIG. 5) corresponds to the TAP of SOP ∥ (curve 52 of FIG. 5). Since the line representing the grating period (line 59 of FIG. 5) intersects only the phase matching curve 52 of FIG. 5, strong coupling is observed in the spectra for SOP ∥ (curve 62 of FIG. 6), while negligible coupling is observed for SOP• (curve 61 of FIG. 6). FIG. 7 shows the spectra, 71 and 72, for the two orthogonal SOPs when the grating period corresponds to line 54 of FIG. 5. Now, the line representing the grating period 54 of FIG. 5 intersects the phase matching curve 52 at two wavelengths, and intersects curve 51 at the TAP. Likewise, the spectra reveal a broadband TAP resonance for SOP• (curve 72 of FIG. 7) but yields a split spectrum for SOP (curve 71 of FIG. 7). For either case, polarization discriminations >20 dB are observed in the 10-nm wide flat spectral region that corresponds to the TAP wavelength of the fiber. The 10-nm bandwidth of this fiber-polarizer may be increased by appropriate fiber design by utilizing known techniques for bandwidth control of polarization insensitive TAP LPGs.

Figure 8:
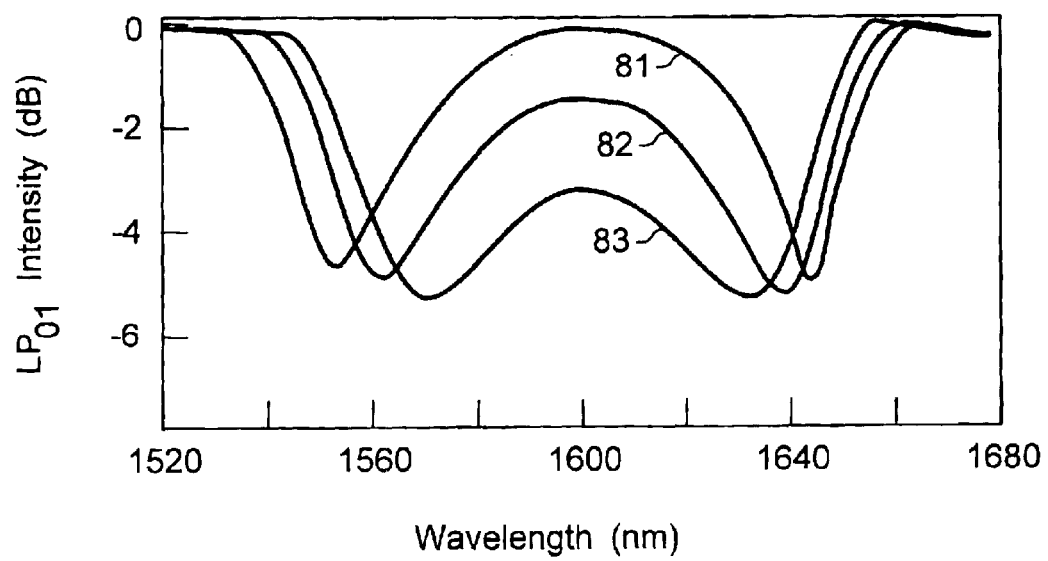
FIGS. 8 and 9 are coupling curves showing the difference in coupling, at various grating periods, between two different SOPs.
Figure 9:
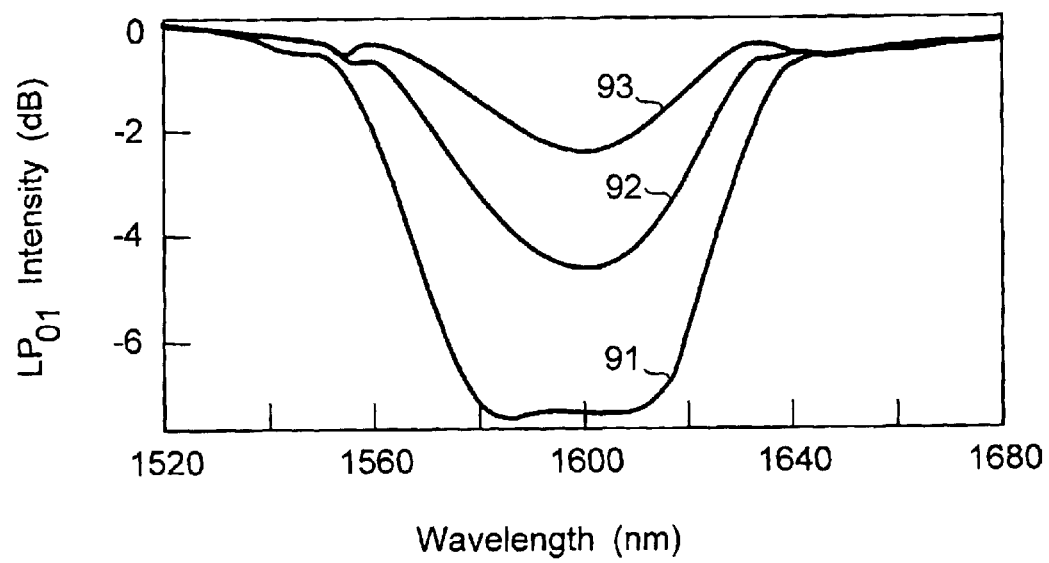
Figure 10:
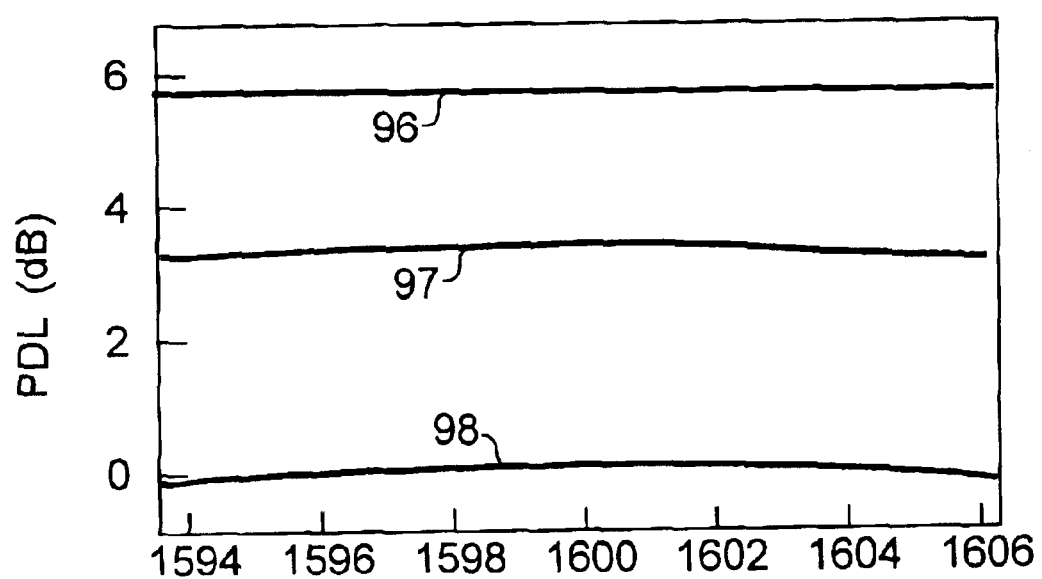
FIG. 10 is a plot of PDL for different grating periods over a broad wavelength range showing the continuous tuning capability of the PDLcon of the invention.

As noted earlier, varying the grating period of LPGs written in a birefringent fiber, e.g. using strain, will change the relative amounts of coupling to the two orthogonal SOPs. FIGS. 8 and 9 show spectra for the two orthogonal SOPs at various grating periods. FIG. 8 shows the spectra 81, 82, and 83, for the SOP ∥ (phase matching curve 52 of FIG. 5) from a 6-dB strong grating written in the fiber, at grating periods corresponding to lines 54, 55, and 56 in FIG. 5. FIG. 9 shows the spectra 91, 92 and 93, for SOP• (phase matching curve 51 of FIG. 3), at grating periods corresponding to lines 54, 55 and 56 in FIG. 5. It is evident that changing the period changes the coupling strengths for the two orthogonal SOPs with opposite polarity. In addition, both sets of spectra yield flat responses in the wavelength range close to the TAP. The difference of the spectra for the two SOPs at any grating period yields the PDL of the device. FIG. 10 shows the PDL spectra, 96, 97 and 98 for grating periods represented by lines 54, 55 and 56 in FIG. 5, respectively. Since the grating strain can be varied continuously, a PDLcon with continuous response is obtained.

While the tuning mechanism illustrated here was strain, which serves to shift the grating period (lines 54–59 in FIG. 5), the same effect can be obtained by holding the grating period (and thus strain) constant, and shifting the phase matching curves of the two orthogonal SOPs (curves 51 and 52 in FIG. 5). Since the spectral position of the phase-matching curves are a function of the refractive index profile of the fiber-waveguide, any mechanism that can dynamically alter the refractive index profile will be applicable here. These mechanisms include, but are not limited to stress-optic, thermo-optic, nonlinear-optic, acousto-optic or electro-optic effects that alter the refractive indices of one or more layers of material used in defining the core or cladding environment of the birefringent TAP fiber.

While all illustrations pertained to mode coupling between the $LP_{01}$ and the $LP_{02}$ mode in few-mode fibers, the same concept can be generalized to LPGs that couple the $LP_{01}$ mode to any core-guided or cladding mode in the fiber.

Several fabrication techniques may be used to realize birefringent fibers that yield TAP LPGs. The circular fiber preform can be designed to possess a TAP for two predetermined core-guided modes. Preferentially plasma etching the preform will yield an oval cladding. Then, drawing the fiber at high temperatures will relax the cladding such that it reverts to a circular cross-section, but in the process transfers the ovality to the core. This yields birefringent core-guided modes. A variety of other techniques are known which produce elliptical performs. Alternately, the preform can itself be made birefringent. This may be achieved by either introducing form birefringence with non-circular geometries, or by adding stress elements to yield stress birefringence. The PDLcon can also be realised by inducing TAP LPGs that couple the $LP_{01}$ mode to a specific higher order cladding-mode (typically the $LP_{0,10}$ through $LP_{0,18}$ modes) whose group velocity is similar to that of the fundamental mode in the spectral region of interest. In this case, birefringence may be induced in the cladding mode by plasma etching a fiber preform to yield an oval cladding. Then, low temperature drawing of the preform will maintain the geometry of the preform, thus resulting in an oval fiber cladding. Alternately, a nominally circular fiber may be preferentially etched by a planar processing technique such as reactive-ion etching, to yield an oval cladding.

Several applications may be envisaged for the PDLcon devices described above. These include, but are not limited to, the following.

It is well known that PMD compensation schemes are generally impaired by PDL. The PDLcon devices described above, installed at various points in a transmission link, can be coupled with a polarimeter or other polarization sensitive monitoring device, to monitor and dynamically tune the PDLcons to minimize the total PDL of the system.

Time dependent PDL arising from the PDL of several components in a lightwave system can lead to temporal fluctuations in the optical signal to noise ratio at the receiver, which increases the bit-error-rate (BER). A feedback loop that connects the receiver sensitivity and its BER with the PDLcons distributed in a system can be used to tune the PDLcons to minimize power fluctuations at the receiver end.

Most fiber-optic components have inherent PDL. For each device, the PDL is typically a fixed value that does not vary over time (only the concatenation of several such devices leads to time-dependent PDL). A PDLcon adjusted in PDL value and added at the output of a fiber-optic component, provides a composite device response with no PDL. This option would be preferable to using faraday rotating mirrors and circulators to minimize PDL, as the latter schemes typically involve the use of costly and lossy devices.

The PDLcon devices described above may be connected to a polarization controller (PolCon) so that the intensity of light passing through this system is a function of the degree of overlap between the SOP vector at the output of the PolCon and the polarization vector orientation that is allowed through the PDLcon. By changing the output SOP of the PolCon, the intensity of light passing through this device may be controlled.

While the foregoing illustrations mainly describe mode propagation in the $LP_{01}$ mode, the same principles can be used with TAP LPGs that involve other core-guided modes. The mechanism used for tuning the TAP LPG is described as varying the grating spacing or the grating refractive index. Both techniques could be used for a single device.

Optical fiber gratings are used for a variety of functions. Conventional LPGs are used as variable optical attenuators. These find applications in, for example, WDM systems for channel equalizers. They may also be used as modulators. The TAP LPG devices described above may offer equivalent functions, at the same time providing the PDLcon function described above.

The physical constitution of LPGs is well known. Basically an LPG is similar to the familiar Bragg grating and comprises a length of optical waveguide wherein a plurality of refractive index perturbations are spaced along the waveguide, but the spacing is characterized by a relatively long periodic distance $\Lambda$. Typically $\Lambda$ is at least 10 times larger than the transmitted wavelength, $\lambda$. In the usual case, $\Lambda$ will be in the range 15–1500 micrometers, and the width of a perturbation in the range $\frac{1}{5}\Lambda$ to $\frac{4}{5}\Lambda$. In some applications, such as chirped gratings, the spacing $\Lambda$ will vary along the length of the grating.

LPGs may be produced by various techniques. A common approach is to write the gratings into a Ge doped fiber using UV light. See, e.g., A. M. Vengsarkar, P. J. Lemaire, J. B. Judkins, T. Erdogan, and J. E. Sipe, "Long-Period Fiber Gratings as Band-Rejection Filters," *J. Lightwave Tech.*, 14, 58(1996); A. M. Vengsarkar, J. R. Pedrazzani, J. B. Judkins, P. J. Lemaire, N. S. Bergano, and C. R. Davidson, "Long-Period Fiber-Grating-Based Gain Equalizers," *Opt. Lett.*, 21, 336(1996); and J. A. Rodgers, R. J. Jackman, G. M. Whitesides, J. L. Wagener, and A. M. Vengsarkar, "Using Microcontact Printing to Generate Amplitude Photomasks on the Surfaces of Optical Fibers: A Method for Producing In-Fiber Gratings," *Appl. Phys. Lett.* 70,7(1997)). These references are incorporated herein by reference for details of LPG construction. However, other methods may also be used. For example, microbend induced LPGs are suitable. These can be realized with acousto-optic gratings, arc-splicer induced periodic microbends, or by pressing the fiber between corrugated blocks that have the required grating periodicity.

Various additional modifications of this invention will occur to those skilled in the art. All deviations from the specific teachings of this specification that basically rely on the principles and their equivalents through which the art has been advanced are properly considered within the scope of the invention as described and claimed.

What is claimed is:

1. An optical device comprising:
   a. a length of birefringent optical fiber:
      i. having ovality greater than 1%,
      ii. having a TAP, and
      iii. supporting a first mode with a first SOP and a second mode with a second SOP,
   b. means for converting light from the first mode to the second mode said means comprising an LPG in the length of optical fiber, and
   c. means for adjusting the refractive index of at least a portion of the length of optical fiber.

2. The optical device of claim 1 wherein the LPG has a grating period $\Lambda$, and the $\Lambda$ of the LPG is at or below the TAP.

3. The optical device of claim 1 wherein the LPG has a grating period $\Lambda$, and the $\Lambda$ of the LPG is above the TAP.

4. The optical device of claim 1 wherein the means for adjusting the refractive index of the length of optical fiber is a means for varying the temperature of the optical fiber.

5. The optical device of claim 1 wherein the first and second modes are core-guided modes.

6. The optical device of claim 1 wherein the first mode is a core-guided mode and the second mode is a cladding mode.

7. An optical device comprising:
   b. a length of birefringent optical fiber:
      i. having ovality greater than 1%,
      ii. having a TAP, and
      iii. supporting a first mode with a first SOP and a second mode with a second SOP,
   b. means for converting light from the first mode to the second mode said means comprising an LPG in the length of optical fiber, the LPG having a grating period $\Lambda$, and
   c. means for adjusting the $\Lambda$ of the LPG.

8. The optical mode converter of claim 7 wherein the LPG has a grating period $\Lambda$, and the $\Lambda$ of the LPG is at or below the TAP.

9. The optical mode converter of claim 7 wherein the LPG has a grating period $\Lambda$, and the $\Lambda$ of the LPG is above the TAP.

10. The optical mode converter of claim 7 wherein the means for adjusting the $\Lambda$ of the LPG is a means for changing the strain on the length of optical fiber.

11. The optical device of claim 7 wherein the first and second modes are core-guided modes.

12. The optical device of claim 7 wherein the first mode is a core-guided mode and the second mode is a cladding mode.

* * * * *